United States Patent [19]
West

[11] Patent Number: 4,893,604
[45] Date of Patent: Jan. 16, 1990

[54] FUEL SYSTEM FOR INTERNAL COMBUSTION ENGINE

[76] Inventor: Geoffrey W. West, Freehills, Dodwell Lane, Bursledon, Hampshire, England

[21] Appl. No.: 270,481

[22] Filed: Nov. 4, 1988

Related U.S. Application Data

[63] Continuation of Ser. No. 26,577, filed as PCT GB86/00337 on Jun. 12, 1986, published as WO87/00245 on Jan. 15, 1987, abandoned.

[30] Foreign Application Priority Data

Jul. 4, 1985 [GB] United Kingdom ............... 8516939

[51] Int. Cl.⁴ ...................... F02M 31/00; F02M 31/08
[52] U.S. Cl. .................................. 123/543; 261/69.1
[58] Field of Search ............... 123/543, 531, 52 M, 123/547, 545, 546; 261/69.1, 145

[56] References Cited

U.S. PATENT DOCUMENTS

| | | | |
|---|---|---|---|
| 3,284,062 | 11/1966 | Obermeyer | 261/50.2 |
| 3,496,919 | 2/1970 | Gerrard | 123/531 |
| 3,743,258 | 7/1973 | Florentine | 123/543 |
| 3,872,191 | 3/1975 | Walcker | 123/543 |
| 3,952,076 | 4/1976 | Chatelain et al. | 261/69.1 |
| 4,030,457 | 6/1977 | Hawryluk | 123/543 |
| 4,194,476 | 3/1980 | Lombardi et al. | 261/145 |
| 4,224,904 | 9/1980 | Clerk | 261/145 |
| 4,357,285 | 11/1982 | Pallares-Martinez et al. | 261/69.1 |
| 4,379,770 | 4/1983 | Bianchi et al. | 261/145 |
| 4,517,134 | 5/1985 | Nakamura et al. | 261/69.1 |

Primary Examiner—Willis R. Wolfe
Assistant Examiner—M. Macy
Attorney, Agent, or Firm—Notaro & Michalos

[57] ABSTRACT

A fuel system for an internal combustion spark ignition engine (27) is provided with a unit (14) for pre-mixing liquid fuel with a part of the total air charge, a spray nozzle (43 117) through which the mixed air/fuel is passed, a heat exchanger (48 102) for heating the mixed air/fuel issuing from the spray nozzle (43 117) to produce a gas and a conduit (49 118) for conveying the gas to the inlet manifold (31 103) of the engine (27) where it mixes with the remainder of the air charge.

9 Claims, 3 Drawing Sheets

FUEL SYSTEM FOR INTERNAL COMBUSTION ENGINE

This application is a continuation of application Ser. No. 026,577, filed as PCT OB 86/00337 on Jun. 12, 1986, published as W087/00245 on Jan. 15, 1987 now abandoned.

This invention relates to a fuel system for an internal combustion spark ignition engine, particularly a petrol engine.

Fuel is usually prepared and supplied to an internal combustion spark ignition engine by a carburettor or a fuel injection system.

In a system having a single or multiple carburettors feeding air/fuel mixtures through a manifold, partial vaporization of the fuel is achieved by allowing the fuel/air mixture to impinge on a hot spot or a heated area or areas which may be heated by the engine coolant or by engine exhaust gases. A liquid wall flow is usually present which is wiped off on de-acceleration and restored by means of introducing a supply of more or less liquid fuel when acceleration is required, by means of an enriching device, i.e. an accelerator pump. This enriching device has an adverse effect upon fuel economy and engine emission. Pre-heating of the air before mixing it with fuel is often used in cold weather to reduce choke operation time. Heating all of the fuel/air charge has a deleterious effect on volumetric efficiency.

Although a reasonable spray formation is sometimes produced at the carburettor discharge orifices, the spray effect is always ruined when the spray impinges on the butterfly valve of the throttle. The spray coalesces into globules of varying sizes which then have to be vaporized as well as is possible at the hot spot or heated area or areas.

Mixture vaporization is particularly poor at the time of a cold start and during the subsequent warm-up period. A cold manifold, low air velocity and poor distribution all contribute to inefficient running of the engine under these conditions. Methods are known that claim to speed up the warm-up period. It is known to provide an electric heater to heat the air/fuel mixture before it passes into the manifold but the difficulties encountered in heating the whole of the air/fuel charge are considerable. It is normally necessary to run the engine using excessively rich air/fuel mixture strengths until the mass of the inlet manifold is completely warmed. This leads to excessive fuel consumption and high emissions.

A carburettor system is wasteful and inefficient as regards emissions control for the primary reasons that:

(i) it requires excessive enrichening of the fuel/air mixture at cold starts and during the warm-up period;

(ii) it requires a wasteful acceleration pump during transistory driving modes, and the fuel supplied by the pump is of inconsistent mixture quality;

(iii) mixture control during transit driving conditions is erratic;

(iv) it is difficult to properly employ lean burn techniques as mixture preparation is of inadequate quality;

(v) separate systems are required to provide weaker part throttle air/fuel mixtures and enriched mixtures for full power.

Single point electronically controlled injection carburettors offer better control of mixture strength in response to differing engine requirements. However, the fuel supply system for this type of carburettor requires a high pressure fuel pump. However well the high pressure spray is formed at the spray orifices, it still has the disadvantage that the spray impinges on the throttle butterfly valve and is effectively spoilt. Distribution difficulties as compared with a normal carburettor system are not ameliorated and charge heating is still necessary. The main advantage of the electronically controlled carburettor is that it may easily be made to respond to a number of engine operating conditions and is thus able to better maintain consistent mixture control.

Multi-point fuel injection systems which may or may not be designed to synchronize fuel delivery with the engine suction impulses largely eliminate distribution problems but these systems require a very high degree of precision in manufacture and are therefore expensive. They do not require the use of charge heating which together with the fact that induction manifolds may be designed for the best aerodynamic performance allows for a substantial improvement in volumetric efficiency as compared with carburettor systems. This applies with particular reference to comparison with single carburettor systems. However, when a multi-point injection system is installed, mixture strength discrepancies of quite a large magnitude may exist as between individual cylinders. This is due to the fact that the amount of fuel to be measured and individually delivered to the separate induction tracts is minute and very small variations in manufacturing tolerances may produce disproportionate differences in fuel delivery. Another problem is that in such systems the quantity of fuel is usually modulated by varying the length of the electrical pulse motivating the injector and even extremely small differences in the electrical properties of the injectors may have a significant effect on the amount of fuel injected.

According to the present invention there is provided a fuel system for an internal combustion spark ignition engine, including means for pre-mixing liquid fuel with a part of the total air charge, a spray nozzle through which the mixed air/fuel is passed, means for heating the mixed air/fuel issuing from the spray nozzle to produce a gas and means for conveying the gas to the inlet manifold of the engine where it is mixed with the remainder of the air charge.

By mixing the fuel with only a part of the total air charge means that not all of the total air charge has to be heated in order to vaporize the liquid fuel. Some embodiments of the invention will now be described, by way of examples, with reference to the accompanying drawings, in which.

Figure 1:
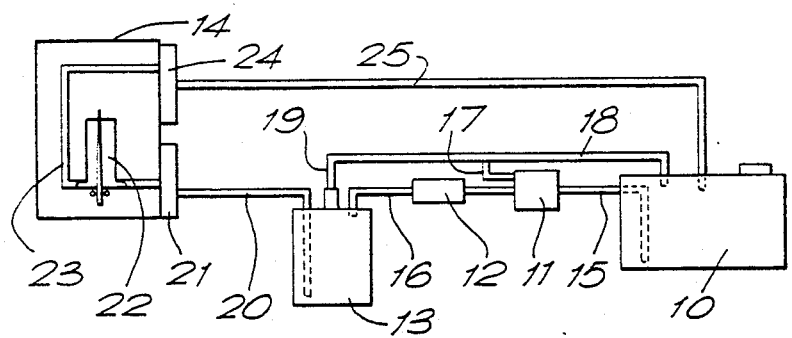
FIG. 1 is a diagrammatic illustration of part of the fuel system.

The fuel system shown in FIG. 1 comprises a fuel storage tank 10, a pump 11 which may comprise a conventional mechanical or electric pump, a filter 12, a vapor separator-pulsation damper unit 13 and a fuel control unit 14 which will be described in greater detail later. Fuel is withdrawn from the tank 10 via a conduit 15 and is supplied via the filter 12 through a conduit 16 to the unit 13. Any vapor in the pump 11 is conveyed by a conduit 17 to a conduit 18 which leads back to the tank 10. Any vapor in the unit 13 is vented to the conduit 18 by a conduit 19. Fuel in the unit 13 flows without pulsation via a conduit 20 to a fuel entry control box 21. The quantity of fuel is controlled by a fuel metering needle valve assembly 22 and excess fuel flows along a conduit 23 to a spill type regulator 24 and then via a spill conduit 25 which leads back to the tank 10. This arrangement stabilizes the pressure at the needle valve orifice at a suitable regulated pressure. Other components, if desired, may be connected to the conduit 18 to vent any vapor back to the tank 10.

Figure 2:
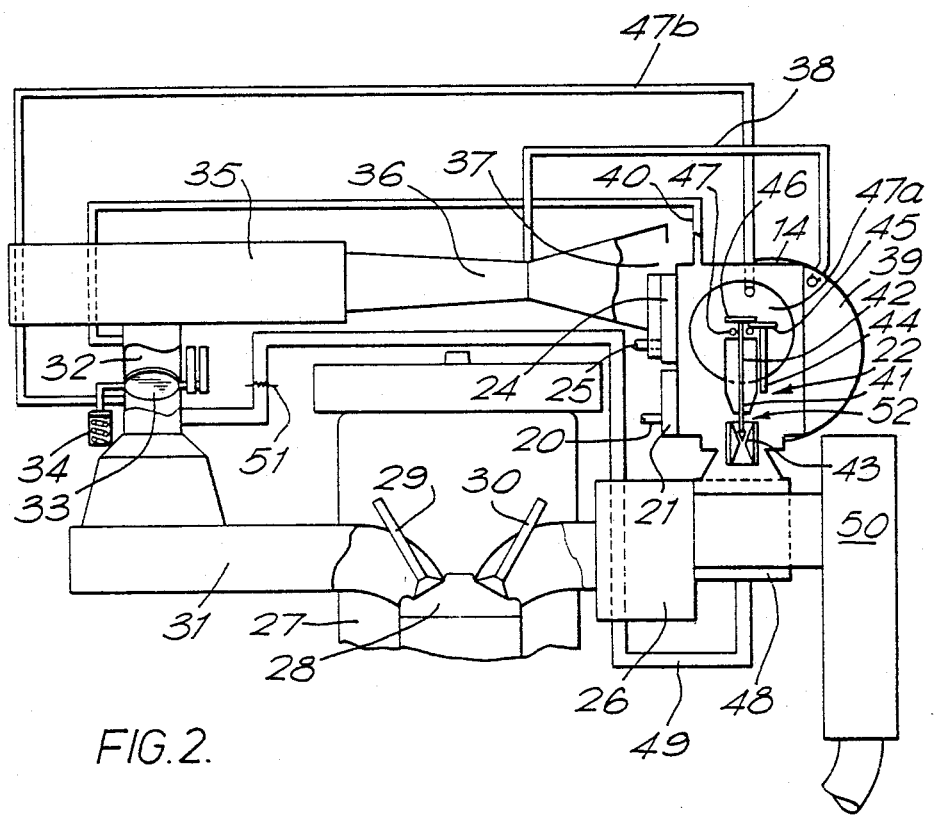
FIG. 2 is a diagrammatic illustration of the remainder of the fuel system.
Figure 3:
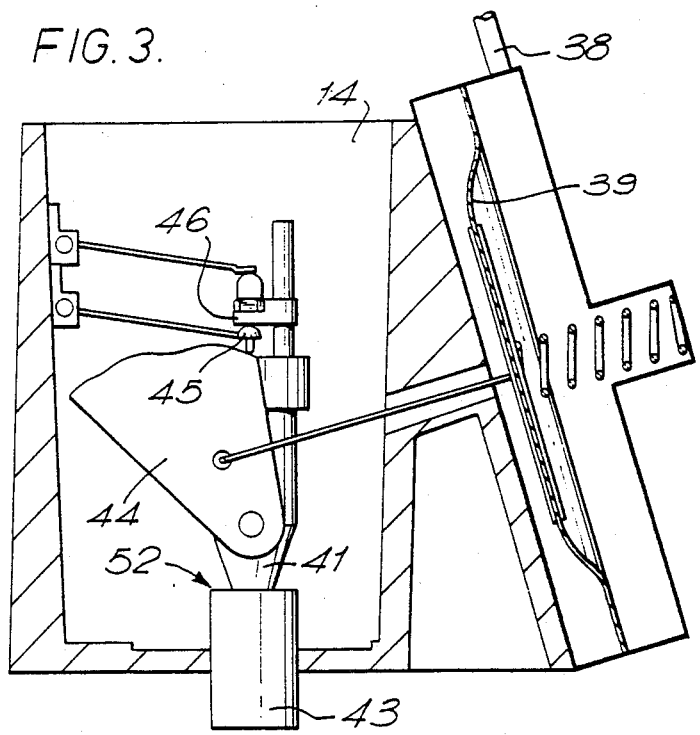
FIG. 3 is a section through the control unit showing the main metering cam.
Figure 4:
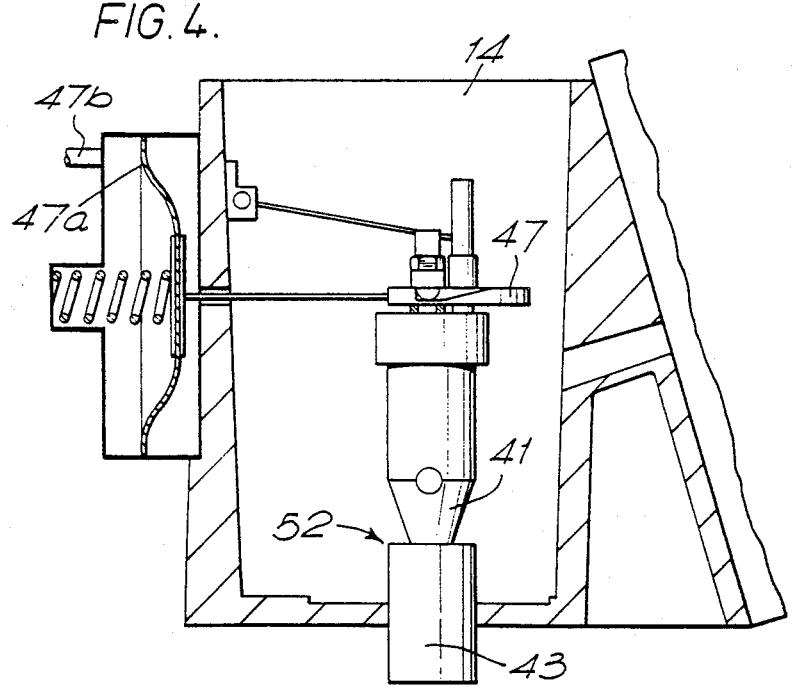
FIG. 4 is a section through the control unit showing the progression cam.

As shown in FIG. 2, the control unit 14 is mounted adjacent the exhaust manifold 26 of the engine 27 which has a cylinder 28, an inlet valve 29, an exhaust valve 30 and an inlet manifold 31. Connected to the inlet manifold 31 is a conduit 32 housing a butterfly throttle valve 33 whose movement is damped by a damper 34. Mounted upstream of the valve 33 is an air cleaner 35 which is connected to a main metering venturi 36 having an air entry 37 which is located at a position such that the air flow into the entry is, as near as possible, at ambient temperature and preferably unaffected by heat radiated from the engine 27. Leading from the venturi 36 is a conduit 38 which is connected to a control diaphragm 39 provided in the control unit 14. Leading from the conduit 32 is a conduit 40 connected to the control unit 14 and which supplies a part of the total air charge to the control unit 14 which is a sealed unit.

The fuel metering needle valve assembly 22 comprises a fuel meter 41 with a calibrated orifice through which extends a needle 42 provided with an extension for idle air control. The extension extends into a venturi spray nozzle 43. A needle operating cam 44 is provided which contacts a cam follower 45 arranged to contact a bridge piece 46 provided on the end of the needle 42. Located below the bridge piece 46 is a progression slide cam 47 connected to a diaphragm 47a which is subjected to vacuum via a conduit 47b connected to the conduit 32 in the region of the lip of the valve 33.

Surrounding the exhaust manifold 26 is a heat exchanger 48 on which the control unit 14 is mounted. The fuel/air mixture issuing as a spray from the spray nozzle 43 enters the heat exchanger 48 where it is heated and the resulting gaseous mixture passes to a transfer conduit 49 which is connected to the conduit 32 downstream of the throttle valve 33. Alternatively, the conduit 49 can be connected directly to the inlet manifold 31.

The heat exchanger 48 exits into a swirl chamber 50 the purpose of which is to swirl the exhaust gases in such a way that the hot gases are thrown against the wall of the heat exchanger 48 for a period of time sufficient to transfer their heat to the heat exchanger 48. The swirl chamber 50 and heat exchanger 48 might be mounted on an extension pipe connecting the components to the exhaust manifold.

An electrically energized pre-heating device 51 may be provided in the conduit 49 for use in heating the fuel/air mixture on cold starting of the engine.

In operation of the engine 27 the fuel metered by the fuel meter 41 is mixed in a region 52 with a small part of the total air charge, this small part of the air charge being extracted through conduit 40. Enough air is mixed with the liquid fuel to assist in breaking-up the liquid fuel. The fuel/air mixture passes into the venturi spray nozzle 43 and is sprayed into the heat exchanger 48 where it vaporizes and the vaporized air/fuel mixture is conveyed as a gas through the conduit 49 to the inlet manifold riser or to a plurality of individual inlet ducts which may be fitted with venturis, by the agency of depression in the inlet manifold 31. For varying load and rpm conditions from idle to fully open throttle conditions, a varying but decreasing proportion of the total air charge is supplied by the vapor delivery conduit 49.

Due to the chamber 50, the exhaust gases are given a swirling motion in the discharge manifold 26 which ensures that intimate contact is established between the exhaust gases and the wall of the heat exchanger 48 thus improving heat transfer.

The conduit 49 is subject to depression in the inlet manifold 31 which is primarily a product of rpm and throttle opening. This varying depression must not be allowed to impinge on the fuel discharge orifice of meter 41 and this is prevented by the venturi spray nozzle 43 which is of small internal diameter and interposed between the heat exchanger 48 and the fuel discharge orifice. Air that is to be mixed with the fuel is admitted in proximity to the fuel delivery and passes with the fuel into and through the spraying venturi nozzle 43. The fuel exit orifice of the meter 41 is so positioned in relation to the venturi nozzle 43 that it is not influenced by varying manifold depressions but is so positioned that fuel exits only under the influence of regulated fuel pressure. The pressure in the vicinity of the fuel orifice is atmospheric.

By inducing only a small part of the total air charge with the fuel it is possible to finely atomize the fuel without employing high fuel pressures and, therefore, an orthodox mechanical or electrical fuel pump 11 of the type used in carburettor systems can be employed. Pulsations are damped out by the unit 13.

It is possible to use a single fuel control unit 14 fed by a low pressure pump 11, the pressure of the single discharge orifice of the meter 41 being regulated to a very low pressure, i.e. 1.5 psi. The basic metering of the fuel delivery is effected by diaphragm 39 moving the cam 44, lifting the needle 42 in response to a signal received from the mass air flow measuring venturi 36 via the conduit 38. The progression slide cam 47 is provided to bridge the gap between idling and the point at which a signal of usable magnitude is received from the main air venturi 36. The slide cam 47 lifts the metering needle 42 from the idle position to a position where the main metering cam 44 takes over control. The progression slide cam 47 is operated by diaphragm 47a which is responsive to a vacuum depression signal received via conduit 47b from a tapping positioned at the edge of the throttle butterfly valve 33.

No enrichment is necessary to facilitate acceleration, but the damper 34 is provided in order to avoid delay in acceleration response when there is a sudden change of throttle position. The throttle 33 is not directly connected to the accelerator pedal. The accelerator pedal mechanism advances a stop which determines the maximum opening of the throttle 33. The throttle 33 is advanced by the aerodynamic forces acting on it and by a spring (not shown). The rate of opening is controlled by the action of the damper 34 which is a pneumatic damper. This operation allows the delivery of vaporized fuel to be properly synchronized with the main air charge inspired by the engine 27.

Cold starting may be effected by temporarily increasing the regulated fuel pressure at the spill type regulator 24.

Figure 5:
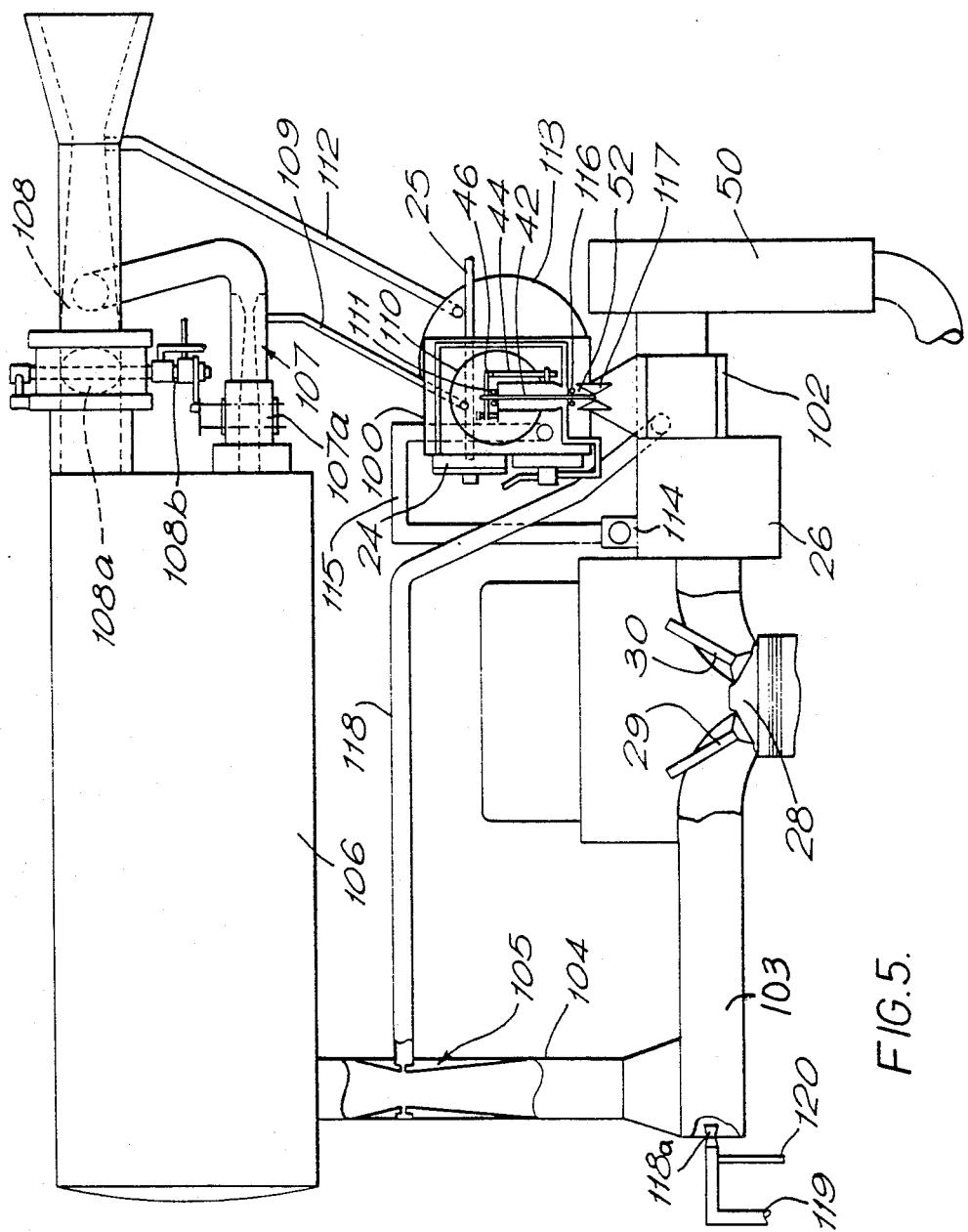
FIG. 5 is a diagrammatic illustration of another embodiment of a fuel system according to the present invention.

FIG. 5 shows another embodiment of a fuel system according to the present invention. The fuel control unit 100 is similar to the unit 14 previously described and is mounted above a heat exchanger 102 of an engine which has a cylinder 28, an inlet valve 29, an exhaust valve 30 and a non heated inlet manifold 103. Connected to the inlet manifold 103 is a conduit 104 which houses a gas venturi 105. Connected to the conduit 104 is a plenum chamber 106 and upstream of the plenum chamber 106 are twin throttles comprising a primary venturi 107 and a main venturi 108. The twin throttles are supplied with filtered air at or as near as ambient temperature as is possible. The twin throttles 107, 108 are arranged so that a valve 108a of the main throttle venturi 108 is kept closed until the air flow through the primary throttle 107 reaches a suitable level. The valve 108a is operated via an interlinking mechanism 108b which controls a valve 107a of controlling the primary throttle 107. Leading from the venturi 107 is a conduit 109 which is connected to a progression diaphragm assembly 110 that controls the movement of a progression cam 111 which is similar to cam 47 described in the first embodiment. Leading from the venturi 108 is a conduit 112 which is connected to diaphragm assembly 113.

The sealed control unit 100 is supplied with filtered warm air by passing through a heat stove 114 conveyed through a conduit 115. This is to avoid the fuel/air spray freezing in certain conditions of temperature and humidity. The heat stove 114 is connected by means (not shown) either to a separate air cleaner or to the main air cleaner of the engine. This induced air in the control unit 100 is mixed with fuel issuing from a needle valve metered orifice 116 in the area between the orifice 116 and a spray venturi 117. The fuel/air mixture issuing as a spray from the spray venturi 117 enters the heat exchanger 102 where it is heated and the resulting gaseous mixture passes into a conduit 118 connected to the venturi 105.

The provision of a progression cam 111 actuated by a signal from the primary venturi 107 not only provides a reliable signal from idling to a point where the main throttle venturi signalled main cam 44 takes over but allows for greater accuracy in calibrating the fuel metering process.

For cold start-up operation a fuel/air mixture is introduced through a spraying venturi nozzle 118a. The nozzle 118a sprays directly into the inlet manifold 103. The nozzle 118a is supplied with air through a conduit 119 and with fuel through a conduit 120. Extra fuel, above the normal warm engine requirement, is not introduced into the heat exchanger 102 during the start and warm-up period thus facilitating rapid warm-up of the heat exchanger 102. This allows cold enrichment to be kept to a minimum with substantial gains in economy and reduced emissions. The extra air and fuel supplied through the nozzle 118a may be controlled manually or automatically by using conventional control methods.

Parts shown in FIG. 5 which are similar or identical to those shown in FIGS. 1 to 4 are identified by the same reference numerals.

The mechanical fuel delivery control units 14 and 100 could be replaced by a modified form of electronically controlled carburettor which uses a high pressure fuel system. Such carburettors, sometimes described as single-point carburettors, provide very close control of the air/fuel mixtures, but they do not overcome the deficiencies of an orthodox carburettor type induction manifold system requiring a hot spot. The good spray producing characteristics are partly nullified by the fact that fuel injection takes place upstream of the throttle buterfly and thus the finely divided fuel coalesces onto the butterfly in the form of droplets of irregular size. By using a modified version of this type of injection carburettor and spraying through a small orifice onto the surface of the heat exchanger, the metered fuel can be easily gasified. The problems normally associated with these carburettors is overcome as vaporized fuel is easily evenly distributed to each cylinder 28.

Whichever fuel control system is used, the engine 27 preferably operates with air/fuel mixtures that are on the weak side of stoichiometric. This reduces emissions and improves economy. An exception is during the cold start-up and warming-up modes.

Transforming the fuel and a small part of the total air charge into a gas removes most of the unequal distribution problems inherent in carburettor/heated manifold systems, single or multi-point EFI systems or mechanical fuel injection systems. With single-point metering there are attendant advantages of reliability, low cost manufacture and maintenance.

A simple aerodynamically efficient inlet manifold system can be provided because the manifold is devoid of the design constraints imposed by the need to provide charge heating. Controlled hot spot mechanisms are not required and the manifold inlet ducts can be designed to give maximum torque.

In the sphere of mixture quality and air/fuel ratios, it is not necessary to provide unnecessarily rich mixtures to compensate for the fact that some cylinders may run weaker than others and an acceleration pump or other device to provide rich mixtures for acceleration is not needed and thus a prime cause of fuel wastage and emission production if eliminated.

There is an avoidance of the wasteful emission which occurs in most carburation systems when the throttle is closed on deceleration. In previous carburation or single-point injection systems the liquid fuel present on the walls of the inlet tract is flashed off and passed unburnt through the engine as an over-rich incombustible mixture. This state is completely avoided in the present system as no liquid fuel is present in the inlet tract.

Maximum power can be obtained without the use of fuel enrichment devices which are wasteful and cause emission.

An air/fuel charge of continuously uniform quality greatly reduces the variations in mixture ratios and distribution equality which although marginally satisfactory in steady speed conditions, may be exaggerated in transient conditions.

The use of air/fuel ratios that, apart from the cold start and warm-up modes, are preferably on the weak side of stoichiometric, reduce emissions, improve the specific fuel consumption, and assist in internal engine cooling which together with the higher quality mixture preparation should permit the use of higher compression ratios which again lead to higher thermal efficiency and higher power output.

Detonation is usually reduced as the air/fuel charge is homogeneous.

Internal cooling promoted by always running with an excess of air also helps to reduce detonation tendencies.

Turbulence is not required to ensure a homogeneous fuel/air mixture. The use of mixture ratios that are always weaker than stoichiometric also ensures that the three main pollutants, HC, CO and the nitrous oxides are only present in the exhaust system in small quantities. It should be possible to avoid the use of catalytic reactors which are expensive and have limited life. Dual-bed, three way catalytic reactors only function properly at a stoichiometric mixture ratio which must at all times be held to close limits. This ratio is not conducive to power production, economy or avoidance of detonation. The ratio requirement involves the use of complicated carburation and other engine controls to maintain the desired ratio at all times. Until the engine is sufficiently warm to function reliably at a stoichiometric level, the catalyst reactor does not function properly, i.e. during the cold start and warm-up period when emissions are at a high level. Another disadvantage in the use of catalytic reactors is that the device itself may produce a dangerous pollutant. Sulphur present in most fuels is changed in the reactor into sulphur oxide and when this leaves the exhaust of the vehicle it is converted into sulphuric acid by the action of the sun.

Using the present system any residual HC, CO and nitrous oxides can be cleaned-up cheaply without the penalties imposed by the use of two or three way reactors by the adoption of air injection into the exhaust system and exhaust gas recirculation. If desired a single oxidation catylitic converter may be employed.

With the present system there is less carbon formation and reduced engine wear as the very rich mixtures normally used for cold starts which tend to wash the lubricant off the cylinder walls are not required.

I claim:

1. A fuel system for an internal combustion spark ignition engine having an inlet manifold with a pressure depression for receiving a charge of air and an exhaust manifold for discharging hot exhaust gases, comprising:

means for conveying a charge of air to the inlet manifold;

a venturi-type spray nozzle for atomizing fuel;

fuel metering and regulating means for supplying liquid fuels to said venturi-type spray nozzle at a regulated pressure which is not subjected to the inlet manifold pressure depression, for atomizing the liquid fuel, said metering and regulating means having a fuel exit;

means defining a space between said fuel exit and said spray nozzle and across which the metered and regulated liquid fuel flows to the spray nozzle for mixing of the metered and regulated liquid fuel with air from said space to form an atomized air/fuel mixture, said space being maintained at atmospheric pressure not being subjected to the inlet manifold pressure depression;

heat exchanger means with a heated surface connected in heat exchange relationship to the exhaust manifold for receiving heat from the exhaust gases, said spray nozzle being connected to said heat exchanger means for directly spraying the atomized fuel onto the heated surface of the heat exchanger means to heat the atomized fuel to form a vaporized gaseous fuel, said heat exchanger means including a portion surrounding the exhaust manifold for being heated by exhaust gases passing through the exhaust manifold and means for swirling the hot exhaust gases leaving the exhaust manifold for increasing an exchange of heat between the hot exhaust gases and said heat exchanger means; and means for conveying the vaporized gaseous fuel from said heat exchanger means to the inlet manifold for mixture of the gaseous fuel with the charge of air supplied to the inlet manifold.

2. A fuel system for an internal combustion spark ignition engine having an inlet manifold for the introduction of final air/fuel mixture and an exhaust manifold for the discharge of hot exhaust gases, the fuel system comprising:

main air charge means for conveying a main charge of unheated air to the inlet manifold;

a venturi-type spray nozzle for forming an atomized rich air/fuel mixture;

secondary air charge means connected to said spray nozzle for conveying a secondary charge of air to said spray nozzle;

liquid fuel metering means for supplying a metered quantity of liquid fuel;

liquid fuel conveying means connected between said metering means and said spray nozzle for conveying the metered quantity of liquid fuel to said spray nozzle for mixture of the metered liquid fuel with the secondary air charge to form the atomized air/fuel mixture;

heat exchanger means connected in heat exchange relationship to the exhaust manifold for receiving heat of exhaust gases passing through the exhaust manifold, said heat exchanger means having a heated surface and being connected to said venturi-type spray nozzle for receiving the atomized air/fuel mixture, which is sprayed directly onto the heated surface of said heat exchanger means and heated thereon to form a vaporized gaseous fuel, said heat exchanger means including a portion surrounding the exhaust manifold for being heated by exhaust gases passing through the exhaust manifold and means for swirling the hot exhaust gases leaving the exhaust manifold for increasing an exchange of heat between the hot exhaust gases and said heat exchanger means;

gaseous fuel conveying means connected between said heat exchanger and the inlet manifold for supplying the gaseous fuel to the inlet manifold to be mixed with the main charge of unheated air to form a final air/fuel mixture for the engine; and an additional atomizing venturi connected to the inlet manifold for receiving liquid fuel and air to form a second atomized air/fuel mixture for injection directly into the inlet manifold for cold start-up and warm-up of the engine.

3. A fuel system according to claim 2, wherein said main air charge means includes a plenum chamber for receiving unheated air for supply to said air charge venturi and throttle means connected to said plenum chamber for supplying the main charge of unheated air to said plenum chamber.

4. A fuel system for an internal combustion spark ignition engine having an inlet manifold with a pressure depression for the introduction of a final air/fuel mixture and an exhaust manifold for the discharge of hot exhaust gases, the fuel system comprising:

main air charge means for conveying a main charge of unheated air to the inlet manifold;

a venturi-type spray nozzle for forming an atomized rich air/fuel mixture;

secondary air charge means connected to said spray nozzle for conveying a secondary charge of air to said spray nozzle;

liquid fuel metering and regulating means for supplying a main metered quantity of liquid fuel at a regulated pressure, said metering and regulating means having a fuel exit;

means defining a space between said fuel exit of said metering and regulating means, and said spray nozzle and across which the metered and regulated liquid fuel flows to the spray nozzle for mixing of the metered and regulated liquid fuel with the secondary air charge to form the atomized air/fuel mixture, said space being maintained at atmospheric pressure and not being subjected to the inlet manifold pressure depression;

heat exchange means connected in heat exchange relationship to the exhaust manifold for receiving heat of exhaust gases passing through the exhaust manifold, said heat exchanger means having a heated surface and being connected to said venturi-type spray nozzle for receiving the atomized air/fuel mixture, which is sprayed directly onto the heated surface of said heat exchanger means and heated thereon to form a vaporized gaseous fuel, said heat exchanger means including a portion surrounding the exhaust manifold for being heated by exhaust gases passing through the exhaust manifold and means for swirling the hot exhaust gases leaving the exhaust manifold for increasing an exchange of heat between the hot exhaust gases and said heat exchanger means; and gaseous fuel conveying means connected between said heat exchanger and the inlet manifold for supplying the gaseous fuel to the inlet manifold to be mixed with the main charge of unheated air to form a final air/fuel mixture for the engine.

5. A fuel system according to claim 4, wherein said liquid fuel metering means comprises a fuel metering needle valve for metering a quantity of fuel to said spray nozzle and a spill type regulator operatively connected to said metering needle valve for receiving excess liquid fuel from said needle valve, said fuel metering needle valve being connected to said secondary air charge means for receiving the secondary charge of air and mixing it with the quantity of fuel.

6. A fuel system according to claim 4, wherein said main air charge means includes a conduit in the inlet manifold having an air charge venturi, said gaseous fuel conveying means comprising a gaseous fuel conveying conduit connected between said heat exchanger means and said air charge venturi.

7. A fuel system for an internal combustion spark ignition engine having an inlet manifold for the introduction of final air/fuel mixture and an exhaust manifold for the discharge of hot exhaust gases, the fuel system comprising:

main air charge means for conveying a main charge of unheated air to the inlet manifold;

a venturi-type spray nozzle for forming an atomized rich air/fuel mixture;

secondary air charge means connected to said spray nozzle for conveying a secondary charge of air to said spray nozzle;

liquid fuel conveying means connected to said spray nozzle for conveying liquid fuel to said spray nozzle for mixture of the liquid fuel with the secondary air charge to form the atomized rich air/fuel mixture, said liquid fuel conveying means comprises a fuel metering needle valve for metering a quantity of fuel to said spray nozzle and a spill type regulator operatively connected to said metering needle valve for receiving excess liquid fuel from said needle valve, said fuel metering needle valve being connected to said secondary air charge means for receiving the secondary charge of air and mixing it with the quantity of fuel;

heat exchanger means connected in heat exchange relationship to the exhaust manifold for receiving heat of exhaust gases passing through the exhaust manifold, said heat exchanger means being connected to said venturi-type spray nozzle for receiving the atomized rich air/fuel mixture, which is sprayed into said heat exchanger means and heated therein to form a gaseous fuel; and gaseous fuel conveying means connected between said heat exchanger and the inlet manifold for supplying the gaseous fuel to the inlet manifold to be mixed with the main charge of unheated air to form a final air/fuel mixture for the engine.

8. A fuel system according to claim 7, wherein said main air charge means includes an air charge venturi for passing the main charge of unheated air, said air charge venturi having a throat, said liquid fuel conveying means, including a first cam connected to said metering needle valve for controlling said metering needle valve, and a diaphragm connected to said first cam and having a side subjected to pressure prevailing at said throat for moving said first cam for controlling said needle valve.

9. A fuel system according to claim 8, including a second cam connected to said metering needle valve for further controlling said metering needle valve, said main air charge means including a second air charge venturi for receiving part of the main charge passing through said first-mentioned air charge venturi and passing the part of the main charge to the inlet manifold, said second air charge venturi having a throat and a second diaphragm connected to said second cam for moving said second cam and being subjected to pressure prevailing at said throat of said second air charge venturi for additionally controlling said needle valve.

* * * * *